(12) United States Patent
Youm et al.

(10) Patent No.: US 7,966,275 B2
(45) Date of Patent: Jun. 21, 2011

(54) METHOD AND SYSTEM FOR CONTROLLING PLAYING OF A CARD GAME WHICH DETERMINES A LEVEL OF A USER BY CHECKING PLAY/CARD PATTERNS

(75) Inventors: Eui-Joon Youm, Kyunggi-do (KR); Keun Woo Choi, Kyunggi-do (KR)

(73) Assignee: NHN Corporation, Seongnam-si (KR)

( * ) Notice: Subject to any disclaimer, the term of this patent is extended or adjusted under 35 U.S.C. 154(b) by 1176 days.

(21) Appl. No.: 11/530,117

(22) Filed: Sep. 8, 2006

(65) Prior Publication Data
US 2007/0060374 A1 Mar. 15, 2007

(30) Foreign Application Priority Data
Sep. 9, 2005 (KR) .................. 10-2005-0084286

(51) Int. Cl.
*G06F 17/00* (2006.01)
(52) U.S. Cl. ........................................ 706/45
(58) Field of Classification Search .................... 706/20, 706/62, 45, 12; 463/1–62
See application file for complete search history.

(56) References Cited

U.S. PATENT DOCUMENTS

| | | | |
|---|---|---|---|
| 5,830,067 A * | 11/1998 | Graves et al. | 463/40 |
| 6,485,367 B1 * | 11/2002 | Joshi | 463/13 |
| 6,545,682 B1 | 4/2003 | Ventrella et al. | |
| 6,663,486 B2 * | 12/2003 | D'Aurora et al. | 463/12 |
| 6,913,531 B1 * | 7/2005 | Yoseloff | 463/13 |
| 7,025,675 B2 | 4/2006 | Fogel et al. | |
| 2002/0090985 A1 | 7/2002 | Tochner et al. | |
| 2002/0142846 A1 | 10/2002 | Paulsen | |
| 2003/0008697 A1 * | 1/2003 | Hartl | 463/11 |
| 2004/0053690 A1 * | 3/2004 | Fogel et al. | 463/31 |
| 2004/0235546 A1 | 11/2004 | Ballard | |
| 2005/0110215 A1 * | 5/2005 | Jackson | 273/292 |
| 2005/0113164 A1 * | 5/2005 | Buecheler et al. | 463/23 |
| 2007/0259707 A1 * | 11/2007 | Kang | 463/16 |

FOREIGN PATENT DOCUMENTS

| | | |
|---|---|---|
| JP | 08-196744 | 8/1996 |
| JP | 2001-029656 | 2/2001 |
| JP | 2001-347072 | 12/2001 |
| JP | 2002-102534 | 4/2002 |
| JP | 2002-239228 | 8/2002 |
| JP | 2002-273045 | 9/2002 |
| JP | 2002-315959 A1 | 10/2002 |
| JP | 2002-315968 | 10/2002 |
| JP | 2007-069005 | 3/2007 |
| KR | 2003-0021762 | 3/2003 |
| KR | 2003-0072640 | 9/2003 |

OTHER PUBLICATIONS

Billings et al., The Challenge of Poker, 2001, University of Alberta, pp. 1-45.*
Cubist Co.,Ltd., "Nintendo game cube books (fantasist online episode 1&2 ultimate system and story No. 4)", Jun. 27, 2003, Inaba Tosio. See Features (pp. 11, 17 and 37).
Sony, Playstation vol. 8, No. 11 finalfantasy XI, May 31, 2002,Chkada Masami. See Features (pp. 16-29).
Web+DB Press vol. 11, Nov. 15, 2008, Cataoka Sikelu. See Features (pp. 126-133).

\* cited by examiner

*Primary Examiner* — David R Vincent
(74) *Attorney, Agent, or Firm* — H.C. Park & Associates, PLC

(57) ABSTRACT

A method and system for controlling a card game artificial intelligence (AI), which plays in a set pattern by a game designer, and enables a play pattern reflecting a recent game trend of garners to be played by a game AI. Also, a method and system which can execute the card game AI in a pattern where a play trend of the gamer is reflected with respect to a particular game situation.

22 Claims, 5 Drawing Sheets

METHOD AND SYSTEM FOR CONTROLLING PLAYING OF A CARD GAME WHICH DETERMINES A LEVEL OF A USER BY CHECKING PLAY/CARD PATTERNS

CROSS-REFERENCE TO RELATED APPLICATION

This application claims the benefit of Korean Patent Application No. 10-2005-0084286, filed on Sep. 9, 2005, in the Korean Intellectual Property Office, the disclosure of which is incorporated herein by reference.

BACKGROUND OF THE INVENTION

1. Field of the Invention

The present invention relates to a method and system for controlling a card game artificial intelligence (AI), which does not play in a pre-set pattern by a game designer, and enables a play pattern reflecting a recent game trend of real person gamers to be played by a game AI.

2. Description of Related Art

Due to developments of wired/wireless communication technologies, various types of online game services are being provided. A great number of gamers are already aware of a card game service among the online games. Also, the card game service is most widely distributed and popular among the gamers.

The card game service connects a plurality of gamers that are located in a remote place, and enables the plurality of gamers to readily play a card game without restriction to a time and a place.

In this case, due to characteristics of the card game, at least one game partner who can play a card game together with the gamer is required. Accordingly, when the gamer does not have a suitable game partner, the gamer may not receive a normal card game service. To solve the disadvantage described above, a number of online card game services provide a card game service which includes a card game artificial intelligence (AI), and makes the card game AI play a card game as the computer-based game partner for the real person gamer who does not have a suitable game partner.

However, in this case, there is a constraint that the conventional card game AI plays a card game in a pattern which was pre-set by the game designer. The conventional card game AI or virtual characters respond in a restricted manner based upon patterns pre-set by game designers. Accordingly, when identical cards are distributed, the real person game AI repeats an identical pattern without exception.

Also, since a play pattern of the card game AI is repeated, the gamer who plays a card game with the card game AI may easily understand the card game AI's play pattern, and thus, quickly lose interest in the card game with the card game AI.

Also, in a conventional method of controlling a card game AI, when updating pattern information associated with the game AI, the game designer may be required to correct the whole game program of the card game AI. Also, additional efforts and costs may be required.

Consequently, the game designer may avoid updating the control program, and thus, may not reflect recent card game trends of gamers. Accordingly, the card game AI may continuously repeat an identical pattern, which may not attract the gamer's interest.

Accordingly, a model of controlling a card game AI which can collect play patterns according to a play trend of a gamer, and enables a play pattern, which is determined as optimal for a particular game situation from the collected play patterns, to play a game according to the card game AI is required.

BRIEF SUMMARY

The present invention provides a method and system for controlling a card game AI, which can execute a card game AI in a play pattern so that a play trend of a gamer is reflected with respect to a particular arrangement situation of game cards.

The present invention also provides a method and system for controlling a card game AI, which can determine a play pattern of the card game AI by considering a gamer's capability level or play style, and also can provide an improved game service, as if a gamer plays a card game against another real gamer, even in a card game service where the card game AI plays a game as a game partner.

The present invention also provides a method and system for controlling a card game AI, which can provide a game service by installing a specialized AI tool, according to a gamer's request, into a gamer terminal, and enabling the installed AI tool to independently provide a game service in the gamer terminal, even when the gamer terminal does not maintain a continuous connection status with an online game server.

The present invention also provides a method and system for controlling a card game AI, which can generate an AI tool by extracting a play pattern of a particular group, such as professional gamers, entertainers, teenage girls, and the like, and packaging the extracted play pattern, and also can provide a game service using a mini game AI which copies an excellent player designated by a gamer by downloading the generated AI tool to the gamer terminal.

According to an aspect of the present invention, there is provided a method of controlling a card game AI, the method including: maintaining a database storing distribution situations of game cards and a plurality of pattern data corresponding to each of the distribution situations; checking a current distribution situation of the game cards for the card game AI to play; selecting one pattern data associated with the checked distribution situation by referring to the database; and executing the card game AI based on the selected pattern data.

According to another aspect of the present invention, there is provided a system for controlling a card game AI, the system including: a pattern data generation component generating a plurality of pattern data by analyzing an input trend of a gamer corresponding to game situations while playing a game; a database maintaining distribution situations of game cards in correspondence to the generated pattern data; a distribution situation check component checking a current distribution situation of the game cards for the card game AI to play; a pattern data selection component selecting one pattern data from the pattern data associated with checked distribution situation by referring to the database; and an AI execution component executing the card game AI based on the selected pattern data of the distribution situation.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
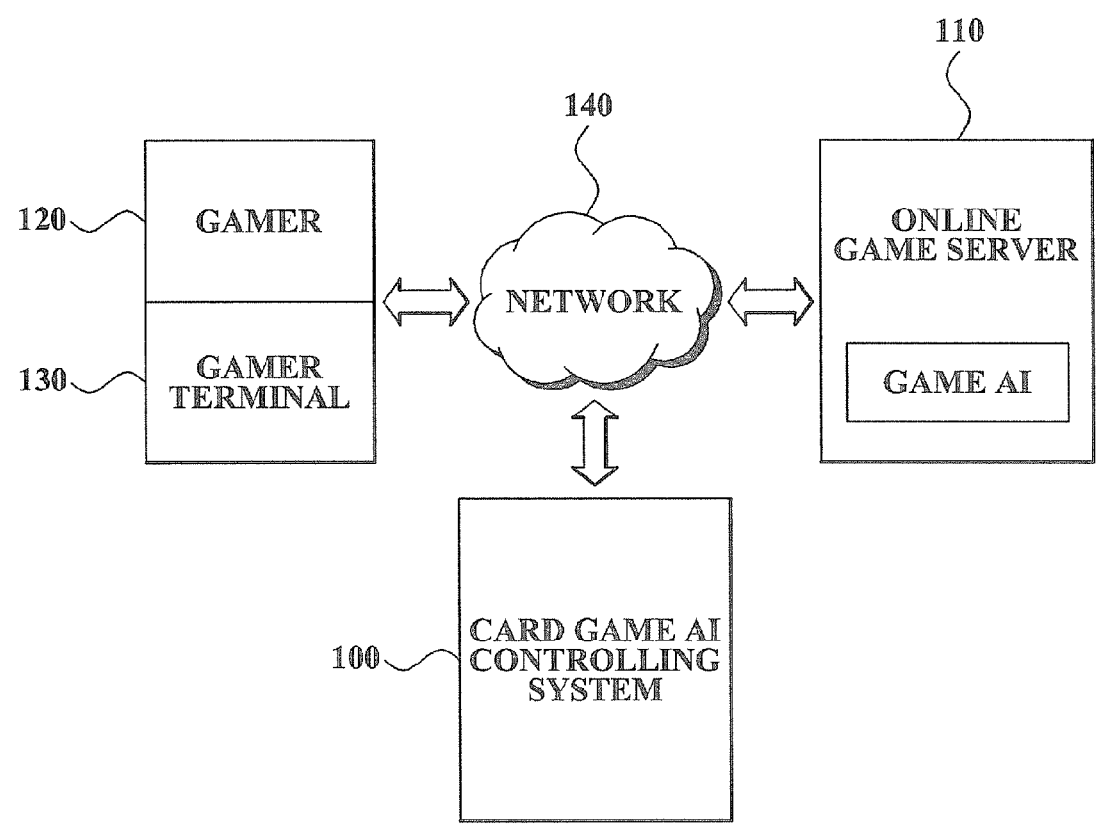
FIG. 1 is a configuration diagram illustrating a system for controlling a card game AI according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

The present invention may be described herein in terms of functional block components and various processing steps. It should be appreciated that such functional blocks may be realized by any number of hardware components configured to perform the specified functions. In addition, it should be appreciated that the present invention may be practiced in conjunction with any number of video game platforms and program genres and that the system described herein is merely one exemplary application for the invention.

Further, as used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

A "card game artificial intelligence (AI)" continuously used throughout the present specification may designate a type of computer-based game player responding to different game situations and conditions which functions as a computer-based multi-user partner for a real person gamer who desires to receive a predetermined game service, and plays a game together with the real person gamer. Specifically, the card game AI does not play a game in a pattern which was pre-set by a game designer. The card game AI may play a game in an optimal pattern against the gamer, from previously played patterns of unspecified real person gamers or randomly played patterns for a particular game situation.

Accordingly, a method and system for controlling a card game AI according to the present invention may fairly reflect recent play trends of gamers and execute the card game AI, and in this case, can execute the card game AI as if a gamer plays a game with another real person gamer. Accordingly, it is possible to provide a game service which enables the card game AI to flexibly cope with various types of game situations.

FIG. 1 is a configuration diagram illustrating a system for controlling a card game AI according to an embodiment of the present invention.

A card game AI controlling system 100 functions to determine a play pattern for the card game AI to play in a particular game situation. Accordingly, the card game AI controlling system 100 generates play patterns, which are collected via various types of channels, into pattern data, and stores the generated play patterns in a database. Also, when the card game AI plays a game in a particular game situation, the card game AI controlling system 100 functions to select pattern data associated with the play pattern, which is determined as optimal for the particular game situation, from the collected play patterns.

Namely, the card game AI controlling system 100 stores a plurality of pattern data in a database, as a solution for a particular game situation, i.e. a particular problem. Also, the card game AI controlling system 100 retrieves and determines pattern data which is determined as optimal for the particular game situation by considering a capability level or a play style of a gamer 120 who plays a card game with the card game AI, by referring to the database. Here, the card game AI may play a play pattern associated with the pattern data, and solve the game situation as a result of the play.

In this case, the card game AI that plays according to the selected pattern data may execute an appropriate level of countering for the game situation. Accordingly, the gamer 120 may regard the card game AI as a worthy component and thus, may not lose interest in the game.

Also, an online game server 110 may designate, for example, a Multiple User Dialogue (MUD) game service server, a Multiple User Graphic (MUG) game service server, and the like, which is connected to a gamer terminal 130 via a network 140 and provides the gamer 120 with the online game service. In the present specification, the online game server 110 supports a card game service, for example, a GOSTOP game, a poker game, and the like, which connects a predetermined number of gamers 120 online, and enables the connected gamers 120 to play a game together. As used in this application, the term "server", unless it is specifically limited, is intended to refer to a computing device or system configured to perform any number of functions and operations associated with game AI controlling system. Alternatively, a "server" may refer to software that performs the processes, methods, and/or techniques described herein. The game AI controlling system 100 is operatively coupled to the online game server 110.

Specifically, the online game server 110 may include the card game AI. When the online game server 110 does not connect a required number of gamers 120 and thus, the connected gamers 120 may not receive a normal card game service, the card game AI plays a game in place of an unavailable gamer 120. The card game AI plays a game in an optimal pattern by considering the previously played play patterns and a capability level of the real person gamer that plays the card game together.

Specifically, the online game server 110 may provide the card game between the gamers 120 which are located in a remote place via a network 140. Also, the online game server 110 may provide the card game between the gamer 120 and the card game AI which plays the card game in place of an unavailable gamer 120.

The gamer 120 may designate an Internet user that controls the gamer terminal 130 to access to the online game server 110 via the network 140, and receives a card game service from the online game server 110 under a predetermined contract. Also, the gamer 120 may transmit a predetermined AI tool request to the card game AI controlling system 100 and install the AI tool, which is provided in response to the AI tool request, into the gamer terminal 130. Accordingly, even when not maintaining a connection status with the online game server 110, the card game service may be provided to the gamer 120 via the AI tool. Also, the gamer 120 may play a card game with the game AI which plays according to the gamer's 120 desired level or style.

The gamer terminal 130 maintains a connection status with the online game server 110 via the network 140, such as the Internet, a telephone line, and the like, and displays a game service which is provided from the online game server 110 on a screen so that the gamer 120 can view. Also, the gamer terminal 130 may be a general concept of a terminal which includes a calculation capability by including a memory and a microprocessor, such as a personal computer (PC), a hand-held computer, a personal digital assistant (PDA), a mobile phone, a smart phone, and the like.

Specifically, the gamer terminal 130 according to the present invention installs the AI tool which is transmitted from the card game AI controlling system 100, and enables the installed AI tool to control an internally included mini game AI. Accordingly, the gainer terminal 130 may provide the card game service to the gamer 120 even without maintaining a continuous connection status with the online game server 110.

The card game AI controlling system 100 stores pattern data in a database, as a solution for a problem so as to play a card game according to a particular distribution situation of game cards. Also, the card game AI controlling system 100 retrieves and determines pattern data which can be optimal for the particular game situation, by considering a level or a style of the gamer 120 who plays a card game with the card game AI, from the database. Also, even with respect to an identical distribution situation of game cards, the card game AI controlling system 100 may change a play pattern for the card game AI to play according to a game situation by enabling a predetermined play pattern associated with the selected pattern data to be executed by the card game AI. Hereinafter, a configuration of a card game AI controlling system 200 according to an embodiment of the present invention will be described with reference to FIG. 2.

Figure 2:
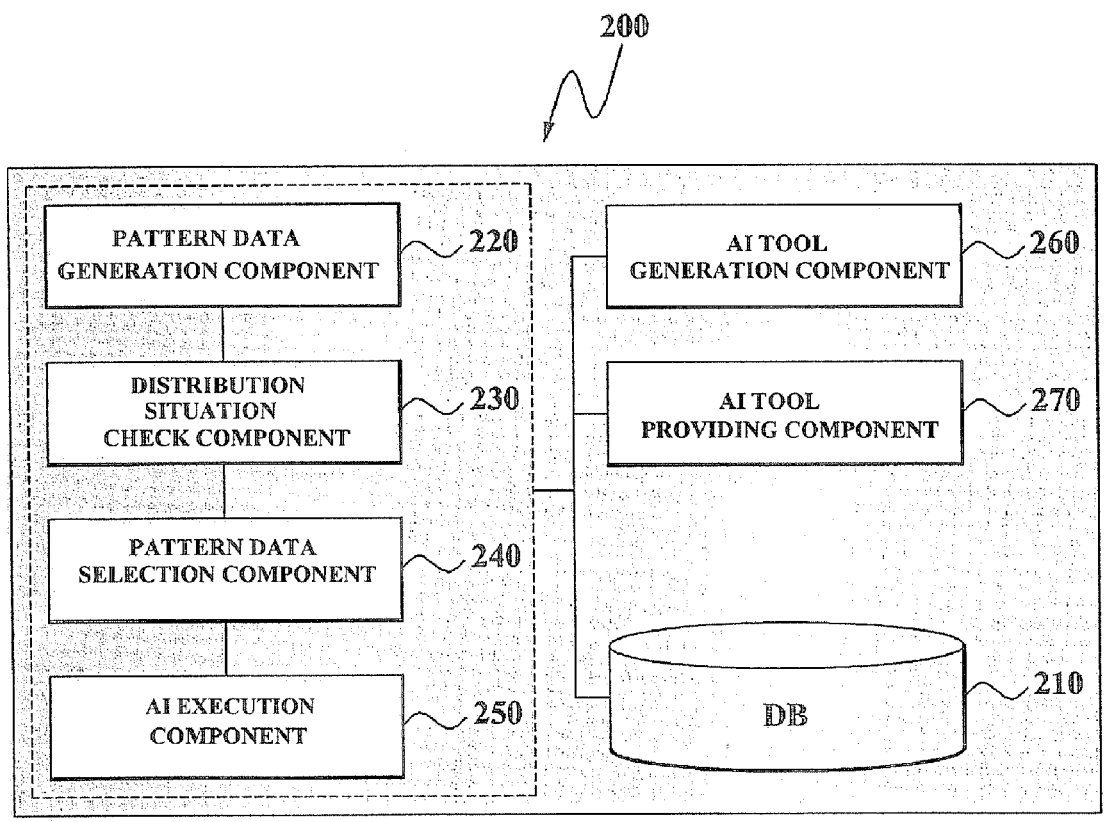
FIG. 2 is a block diagram illustrating a system for controlling a card game AI according to an embodiment of the present invention.

FIG. 2 is a block diagram illustrating a system for controlling a card game AI according to an embodiment of the present invention.

The card game AI controlling system 200 includes a database 210, a pattern data generation component 220, a distribution situation check component 230, a pattern data selection component 240, and an AI execution component 250.

The database 210 stores distribution situations of game cards and a plurality of pattern data corresponding to each of the distribution situations. Specifically, the database 210 predicts various types of distribution situations of game cards which may occur in a card game, and stores various types of play patterns corresponding to the possible distribution situations. Accordingly, when the card game AI progresses a game with respect to a particular distribution situation of game cards, a suitable play pattern may be determined by using the pattern data stored in the database 210.

The pattern data may be generated by the pattern data generation component 220 which utilizes previously played play patterns in association with the distribution situation of game cards.

The pattern data generation component 220 functions to collect play patterns, which were played by unspecified gamers, for each of distribution situations of game cards, and generate each of the play patterns into pattern data. Specifically, the pattern data generation component 220 generates the play patterns, which can be applied for the particular distribution situation, into the pattern data. Also, the pattern data generation component 220 may generate the pattern data which can induce the card game AI to play similar to the play trend of the real gamer 120 by selecting the play pattern to be generated into the pattern data from the previously played play patterns.

Also, as another method of generating pattern data, the pattern data generation component 220 may make the card game AI randomly play patterns with respect to one arrangement situation of game cards, and generate each of the played play patterns into the pattern data. Hereinafter, the above-described method is referred to as a "trial and error" method. Specifically, the pattern data generation component 220 may execute the card game AI by applying various types of play patterns with respect to the identical distribution situation, and may generate each of the played play patterns as the pattern data.

In the case of the trial and error method, a server end including the card game AI, i.e. the online game server 110, may execute the card game AI to randomly play a play pattern via a control of the card game AI controlling system 200. In this case, great amounts of calculations are required which may cause excessive loads in the server end. Accordingly, the pattern data generation component 220 may alleviate loads in the server end by identifying the gamer terminal 130, which waits for a turn, from the gamer terminals 130 receiving the game service associated with the card game AI, and enabling the identified gamer terminal 130 to execute a portion or the whole of the randomly played play patterns by the card game AI.

Specifically, the pattern data generation component 220 may identify the gamer terminal 130 which waits for a turn while the game is in progress, and enable the identified gamer terminal 130 to randomly play the play patterns instead of the card game AI while the gamer terminal 130 is waiting. Also, the pattern data generation component 130 may acquire a play result from the gamer terminal 130.

Figure 3:
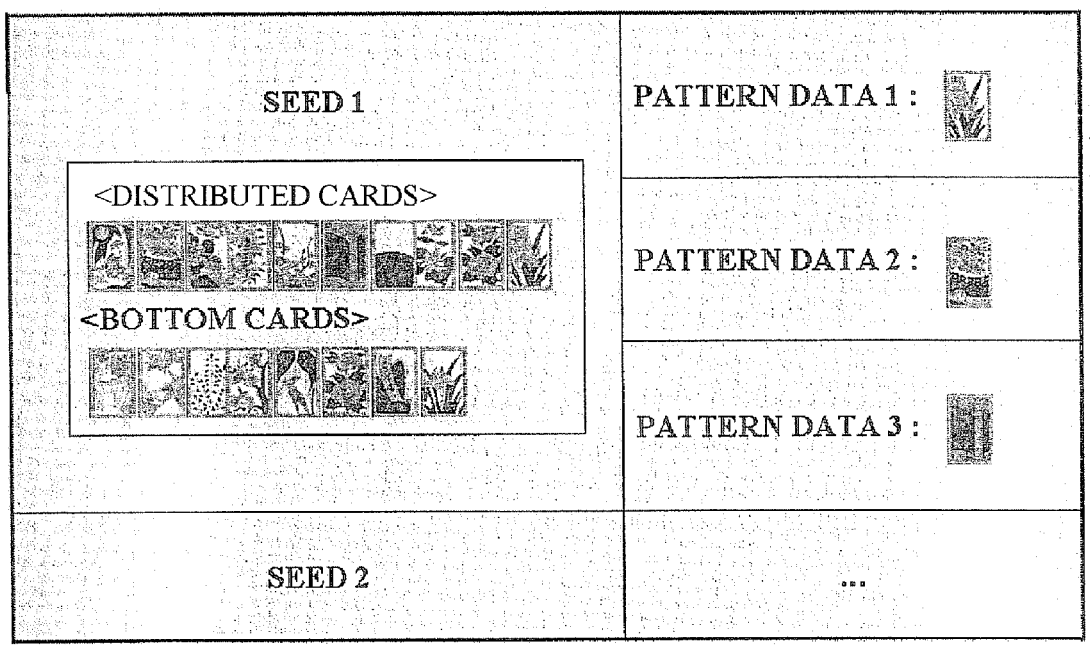
FIG. 3 is a diagram illustrating an example of a database according to an embodiment of the present invention.

FIG. 3 is a diagram illustrating an example of a database according to an embodiment of the present invention.

As described above, the database 210 stores distribution situations of game cards and pattern data corresponding to each of the distribution situations of game cards. Here, the distribution situation of game cards includes information about a combination of distribution cards or the combination of bottom cards. As an example, when the card game service is a 'MATGO GOSTOP' game, the distribution situation of game cards may designate the distribution cards, an initial 10 cards which are allotted to each of the gamers 120, and bottom cards, subsequent 8 cards which are provided on a bottom.

Referring to FIG. 3, the database 210 refers the distribution situations of game cards, i.e. the combination of distribution cards and the combination of bottom cards, as a 'seed', and makes a plurality of pattern data correspond to each of the distribution situations.

As an example, when the card game service is the 'MATGO GOSTOP' game, the database 210 may designate an arrangement situation, "the combination of 10 distribution cards 'BIKWANG, . . . , CHO5' and the combination of 8 bottom cards 'POONG10, . . . , CHOPI'" as a seed 1, and store the designated arrangement situation. Also, the database 210 may store play patterns, which can be played in an identical arrangement situation to the seed1, as pattern data1, pattern data2, and pattern data3. Referring to the database 210 of FIG. 3, the previously played play pattern selected a game card, 'CHO5', from the distribution cards (pattern data1), selected a game card 'POONG10' from the distribution cards (pattern data2), or selected a game card 'BIPI' from the distribution cards, in the distribution situation of game cards shown in the seed1.

The pattern data, which is stored in the database 210 in correspondence to the seed1, may be generated from the play patterns which were previously played by unspecified gamers with respect to the distribution situation of the seed1. Also, the pattern data may be generated from the randomly played play patterns when the card game AI predicts the distribution situation of the seed1.

The distribution situation check component 230 functions to check a current distribution situation of game cards for the card game AI to play. Specifically, the distribution situation check component 230 functions to check the distribution situation of game cards for the card game AI to substantially play, from various types of distribution situations of game cards which may occur in the card game service.

As described above, each of specialized distribution situations of game cards is referred to as the 'seed'. The distribution situation check component 230 may check the distribution situation of game cards with the seed. As an example, when the distribution situation of game cards for the card game AI to play is "the combination of 10 distribution cards 'BIKWANG, . . . , CHO5' and the combination of 8 bottom cards 'POONG10, . . . , CHOPI'", the distribution situation check component 230 may check the distribution situation with the 'seed1'.

The pattern data selection component 240 selects one pattern data from the pattern data associated with the checked distribution situation by referring to the database 210. Specifically, the pattern data selection component 240 functions to determine a play pattern for the card game AI to play with respect to the distribution situation of game cards. Also, the pattern data selection component 240 selects pattern data of the play pattern which is determined as optimal to play a card game, from a plurality of pattern data corresponding to one distribution situation.

In this instance, the pattern data selection component 240 may select one pattern data from the plurality of pattern data by considering a capability level, a play style, and the like, of the gamer 120 who plays the card game with the card game AI. Accordingly, the database 210 may store difficulty information or style information corresponding to each of the pattern data.

As an example, the pattern data generation component 220 may generate difficulty information or style information associated with a play of the card game AI by analyzing the play pattern when generating the pattern data. Also, the pattern data generation component 220 may additionally store the generated difficulty information or the style information in the database 210 in association with the pattern data of the play pattern.

Specifically, when the card game AI plays a card game based on the pattern data, the database 210 maintains difficulty information or style information in correspondence to each of the pattern data. Here, the difficulty information is about a level of the card game AI, for example, a low level, an intermediate level, and a high level. Also, as used in this application, the term "style information" is intended to refer to a style of play, for example, a genealogy pursuit type (or flush pursuit type in a poker game) and a KWANG collecting type.

Accordingly, the pattern data selection component 240 may check the capability level or the play style of the gamer 120 who plays against the card game AI, and identify the difficulty information or the style information corresponding to the gamer's 120 checked capability level or play style, from the database 210.

Also, the pattern data selection component 240 may determine optimal pattern data, which is executed by the card game AI for a particular game situation, from the pattern data which were retrieved from the database in association with a particular distribution situation by limiting the pattern data corresponding to the difficulty information or the style information.

In the present specification, it has been described that the pattern data selection component 240 randomly selects one pattern data from the limited pattern data according to the distribution situation and the difficulty information or the style information, however, the present invention is not limited thereto. The pattern data selection component 240 may select one pattern data by considering finally acquired points when using particular pattern data.

In this case, the pattern data may include point information as a play result of the play pattern associated with the pattern data. The pattern data selection component 240 may select pattern data comprising point information greater than a predetermined numerical value, from the pattern data which is stored in the database 210 in correspondence to the distribution situation, and randomly select one pattern data from the selected pattern data.

Here, the point information may be generated by considering final points which are acquired when playing the play pattern. As an example, points, which can be normally acquired by playing a corresponding play pattern, may be included in the point information.

As an example, when generating the pattern data, the pattern data generation component 220 may count a number of plays that the play pattern associated with the corresponding pattern data has been randomly played by the gamer 120 or by the card game AI. Also, the pattern data generation component 220 may calculate total points by summing up each final point which are acquired by playing the play pattern and playing the card game. Next, the pattern data generation component 220 may calculate the normally acquired final points by dividing the calculated total points by the counted number of plays, and make the calculated final points correspond to the pattern data as the point information.

In an example of the above-described 'MATGO GOSTOP' game, when the play pattern associated with the pattern data1 is played in four card games, and each of the final points in the card games is '1, 5, 0, and 2', the pattern data generation component 220 may include '2' in the pattern data1 as the point information.

Also, when '2' is selected as the numerical value, the pattern data selection component 240 may select only the pattern data which has point information greater than '2'. Accordingly, the pattern data selection component 240 may force the card game AI, which plays based on the pattern data, to play the card game for cards that have point information greater than '2' having highest priority.

The AI execution component 250 functions to execute the card game AI based on the selected pattern data with respect to the distribution situation. Specifically, the AI execution component 250 enables the card game AI to play an optimal play pattern for a particular arrangement situation by using the pattern data which is identified from the database 210 in correspondence to the arrangement situation, i.e. seed, and the difficulty information or the style information.

According to another embodiment of the present invention, a system for controlling a card game AI which can play a play pattern with respect to a particular game situation independently in a gamer terminal (without maintaining an online status) will be described.

In this case, the card game AI controlling system 200 may further include an AI tool generation component 260 and an AI tool providing component 270.

When a request for an AI tool including difficulty information or style information is received from the gamer terminal 130, the AI tool generation component 260 retrieves pattern data corresponding to the difficulty information or the style information from the database 210, and generates the AI tool by using the retrieved pattern data. Specifically, the AI tool generation component 260 retrieves the pattern data corresponding to the difficulty information or the style information which is generated in association with the play of the game AI, from the database 210, and generates the AI tool by using the retrieved pattern data. Here, the AI tool may designate a type of a game control program which can execute a mini game AI included in the gamer terminal 130. The AI tool generation component 260 may generate a specialized AI tool by considering the features, such as the difficulty information and the style information, of the pattern data which is utilized for generating the AI tool.

As an example, when generating the AI tool for a game service for an unskilled gamer 120, the AI tool generation component 260 may retrieve the pattern data corresponding to the difficulty information, 'low level', from the database 210, and may generate the AI tool, 'low-grade player', for the low-leveled gamers 120 by using the retrieved pattern data.

The AI tool generation component 270 provides the gamer terminal 130 with the generated AI tool in response to the request for the AI tool. Specifically, in response to the request for the AI tool from the gamer terminal 130, the AI tool generation component 270 provides the gamer terminal 130 with the AI tool which is generated in association with the difficulty information or the style information.

As an example, when the request for the AI tool including the difficulty information, 'low level', is received from the gamer terminal 130, the AI tool providing component 270 may provide the generated AI tool 'low-grade player' to the gamer terminal 130 which transmitted the request for the AI tool.

The AI tool, which is installed in the gamer terminal 130, controls the mini game AI included in the gamer terminal 130 to play a game. Also, the mini game AI may select one pattern data, which is determined, as optimal for a particular game situation for the mini game AI to play, from the pattern data which are included in the installed AI tool. Since the mini game AI plays a game based on the selected pattern data, an optimal play pattern for the particular game situation may be played by the mini game AI.

Also, the AI tool providing component 270 charges the gamer 120 with a predetermined fee for providing the AI tool to the gamer terminal 130. Accordingly, an operator of the present system may make some financial benefits. When charging the gamer 120, a general payment pattern may be utilized, and thus, description related thereto will be omitted.

Also, the gamer terminal 130, which received the AI tool and internally installed the received AI tool, may generate an upgrade request at a predetermined time interval. The card game AI controlling system 200 enables the provided AI tool to be continuously upgraded by receiving the generated upgrade request and transmitting an updated AI tool to the gamer terminal 130. In this case, the AI tool generation component 260 may further include, for example, a second database which stores the generated AI tool. The second database may store the generated AI tool by the AI tool generation component 260 with a name associated with the difficulty information or the style information.

Specifically, the card game AI controlling system 200 stores the generated or the provided AI tool, reflects the pattern data which is generated according to the recent input trend of the gamer 120, continuously updates the generated AI tool, and provides the updated portion to the gamer terminal 130 when the upgrade request is received from the gamer terminal 130. As described above, the card game AI controlling system 200 secures continuous upgrading even with respect to the AI tool which is provided to the gamer terminal 130. Accordingly, the card game AI controlling system 200 may provide the gamer 120 with a game service, as if the gamer 120 plays a game with another human gamer, via the mini game AI. Here, the mini game AI reflects the gamer's 120 play trend corresponding to a particular period.

Also, when generating the AI tool, the AI tool generation component 260 may identify at least one pattern data from the database 210 by considering a game level of the mini game AI and the difficulty information of the pattern data, and generate the AI tool by using the identified pattern data. Specifically, the AI tool generation component 260 may classify and retrieve pattern data by dividing a game level of the mini game AI into, for example, a high level, an intermediate level, and a low level. Also, the AI tool generation component 260 may generate the AI tool where the difficulty degree is specialized for each of the retrieved pattern data. As an example, the AI tool generation component 260 may generate the AI tool 'high level' for advanced gamers 120 by limitedly retrieving only the pattern data where the difficulty information is greater than 'Lv 100', and using the retrieved pattern data. Also, the AI tool generation component 260 may generate the AI tool 'strategic player' for defensive style gamers 120 by limitedly retrieving only the pattern data including the style information about 'teenage girls' based on an occupation, an age, a sex, and the like, and using the retrieved pattern data.

According to the present invention, it is possible to generate an AI tool by extracting a play pattern of the particular group, such as professional gamers, entertainers, teenage girls, and the like, and packaging the extracted play pattern, and to provide a gamer with a multi-user game service for a particular group by downloading the generated AI tool to a gamer terminal.

As an example, the gamer may receive the game service via the mini game AI which plays a game in a similar pattern as an actual professional baduk player, Lee changho, by downloading the AI tool associated with Lee changho.

Accordingly, when generating the AI tool and activating the generated AI tool in the gamer terminal 130 according to the present invention, the gamer 120 may receive a game service in an identical environment even when the gamer terminal 130 does not maintain a connection status with the online game server 110. Also, according to the present invention, an optimal play pattern for a particular game situation may play a game via the mini game AI. Accordingly, it is possible to provide an improved game service as if a gamer plays a game with another actual person.

Hereinafter, operations of the card game AI controlling system 200 according to an embodiment of the present invention will be described in detail.

Figure 4:
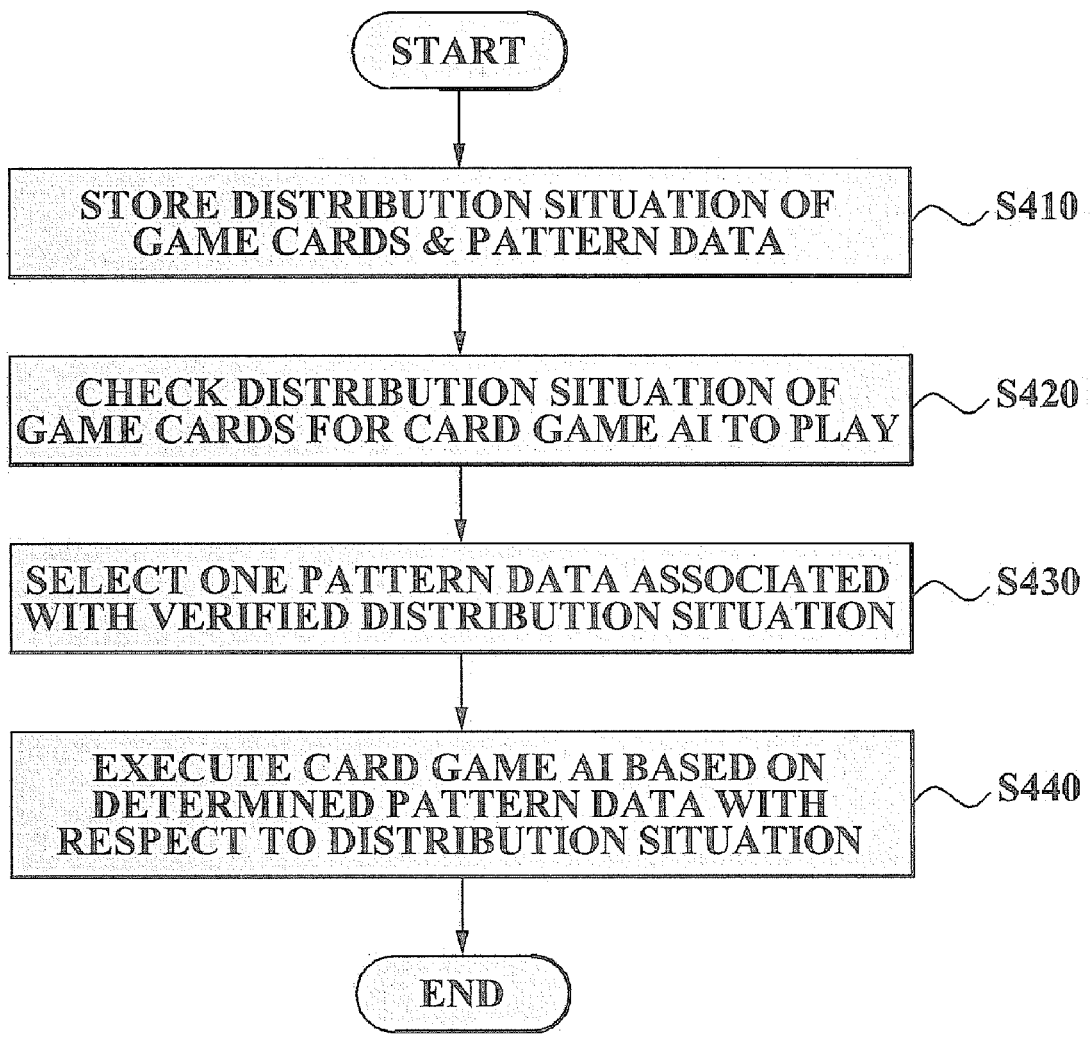
FIG. 4 is a flowchart illustrating a method of controlling a card game AI according to an embodiment of the present invention.

FIG. 4 is a flowchart illustrating a method of controlling a card game AI according to an embodiment of the present invention.

The method of controlling the card game AI may be performed by the card game AI controlling system 200 as described above.

In operation S410, the card game AI controlling system 200 maintains the database 210 which stores distribution situations of game cards and a plurality of pattern data corresponding to each of the distribution situations. Operation S410 is a process of collecting play patterns which can be played with respect to the distribution situation, generating the collected play patterns into pattern data, and storing the generated pattern data in the database 210.

Also, in operation S410, the card game AI controlling system 200 may generate the play patterns, which were previously played by unspecified gamers with respect to the particular arrangement situation, into the pattern data. Also, the card game AI controlling system 200 may enable play patterns associated with the game progress of the particular arrangement situation to be randomly played by the card game AI, and generate each of the randomly played play patterns into the pattern data. Here, the above-described method is referred to as the trial and error method. When generating the pattern data by using the trial and error method, the card game AI controlling system 200 may alleviate excessive loads on the server end by enabling the gamer terminal 130 with a portion or the whole of the randomly played play patterns.

Specifically, in operation S410, the card game AI controlling system 200 may indicate the distribution situation of game cards with the combination of distribution cards or the combination of bottom cards (seed), and stores the distribution situation in the database 210. Also, the card game AI controlling system 200 may collect the play patterns which can be played with respect to the corresponding distribution situation, and store the collected play patterns, as the pattern data, in the database 210 to correspond to the distribution situation as shown in FIG. 3. Here, the combination of distribution cards is associated with a kind of game cards and a number of game cards which are allotted as the distribution cards from the game cards. Also, the combination of bottom cards is associated with the kind of game cards and the number of game cards which are allotted as the bottom cards from the game cards. As an example, when the game service is a 'MATGO GOSTOP' game, the initially allotted distribution cards may be the combination of 10 flower cards and the initially allotted bottom cards may be the combination of 8 flower cards.

In operation S420, the card game AI controlling system 200 checks the distribution situation of the game cards for the card game AI to play. Operation S420 is a process of understanding a game situation where the card game AI substantially plays in the card game. In operation S420, the card game AI controlling system 200 may determine the distribution situation as a 'seed'. Accordingly, when retrieving the pattern data from the database 210, the card game AI controlling system 200 may quickly retrieve optimal pattern data from the database 210 by using the seed.

In operation S430, the card game AI controlling system 200 selects one pattern data associated with the checked distribution situation by referring to the database 210. Operation S430 is a process of randomly selecting one pattern data from the plurality of pattern data corresponding to the arrangement situation of game cards. Specifically, the card game AI controlling system 200 checks a capability level or a play style of a gamer who plays against the card game AI, identifies the difficulty information or the style information corresponding to the capability level or the play style of the gamer, from the database 210, and selects one pattern data from the pattern data corresponding to the identified difficulty information or the style information.

As described above, the card game AI according to the present invention may flexibly control the card game AI's game play capability level or game play style according to the gamer 120 who plays a game against the card game AI.

In operation S440, the card game AI controlling system 200 executes the card game AI based on the selected pattern data with respect to the distribution situation. Specifically, in operation S440, the card game AI controlling system 200 enables the card game AI to progress the game by matching one distribution card, which is selected based on the selected pattern data, with one of the bottom cards, in a particular distribution situation which includes the combination of distribution cards or the combination of bottom cards. Namely, the card game AI plays a play pattern which bets on the selected distribution card based on the pattern data, and matches the selected distribution card with one of the bottom cards.

As described above, according to the present invention, it is possible to provide a lifelike game service as if a gamer plays a game against another real gamer, by enabling a card game AI to play a play pattern, which is determined as optimal for a particular arrangement situation of card games, from previously played play patterns or randomly played play patterns.

An AI tool for controlling a mini game AI included in the gamer terminal 130 to provide an independent card game service in the gamer terminal 130 according to another embodiment of the present invention will be described.

Figure 5:
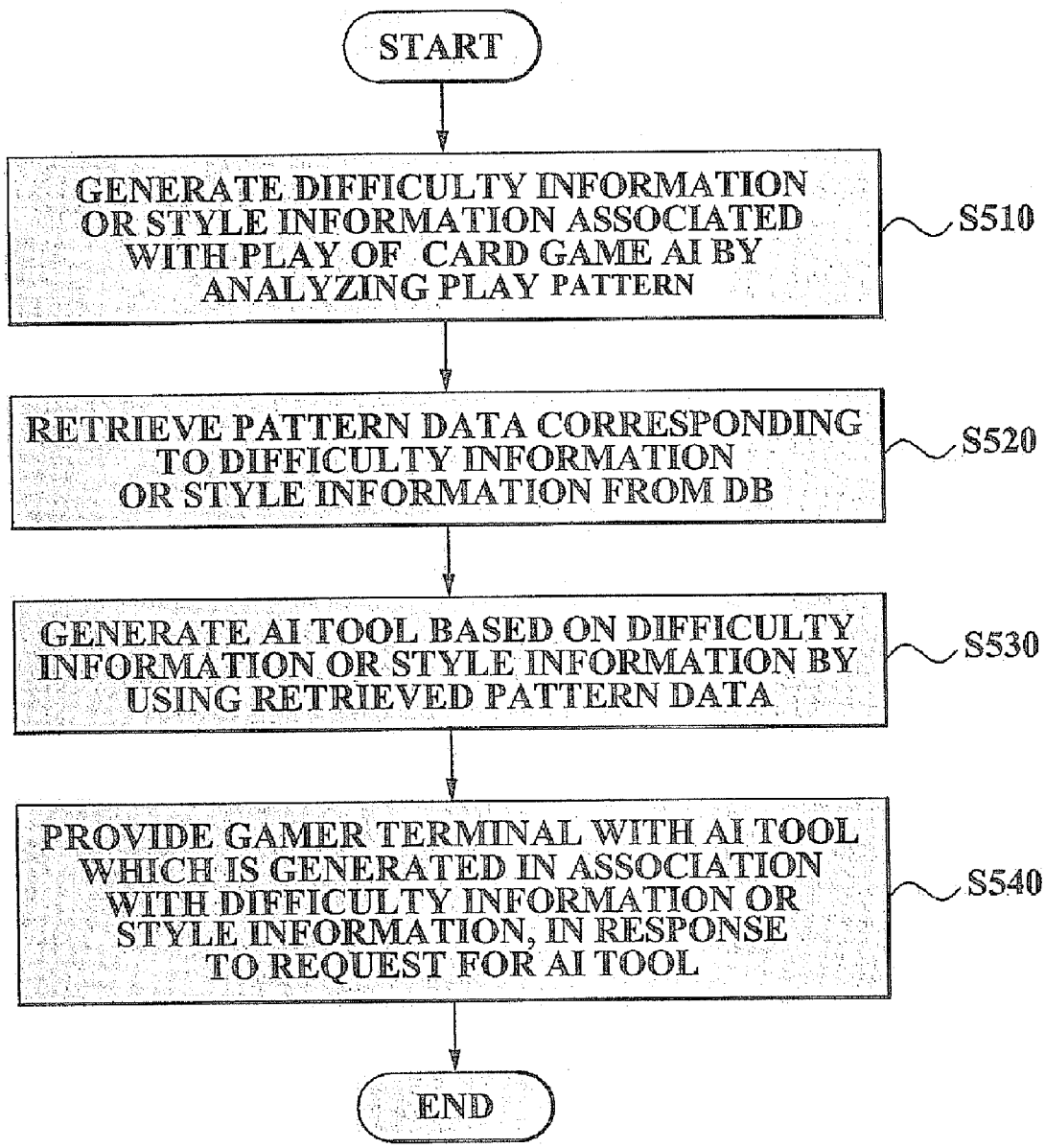
FIG. 5 is a flowchart illustrating an example of generating an AI tool according to an embodiment of the present invention.

FIG. 5 is a flowchart illustrating an example of generating an AI tool according to an embodiment of the present invention.

In operation S510, the card game AI controlling system 200 generates style information or difficulty information associated with a play of the card game AI by analyzing the play pattern. Operation S510 is a process of predicting a difficulty degree or a play style in a game when the game AI plays a corresponding play pattern, and generating difficulty information or style information.

In operation S520, the card game AI controlling system 200 retrieves the pattern data corresponding to the generated difficulty information or the style information from the database 210. Operation S520 is a process of extracting the pattern data associated with identical difficulty information or the pattern data associated with identical style information from the database 210. As an example, the card game AI controlling system 200 may retrieve all the pattern data associated with the play pattern which is determined as the difficulty information 'low level', from the database 210.

In operation S530, the card game AI controlling system 200 generates an AI tool based on the difficulty information or the style information by using the retrieved pattern data. Operation S530 is a process of generating the AI tool by using the retrieved pattern data which is classified for each property, for example, an identical difficulty degree and an identical style. Here, a name which is determined as suitable for the property may correspond to the generated AI tool. As an example, the AI tool 'low-grade player' may correspond to low level gamers, and the AI tool 'GODORI' may correspond to genealogy pursuit style gamers.

In operation S540, when a request for the AI tool including the difficulty information or the style information is received from the gamer terminal 130, the card game AI controlling system 200 provides the gamer terminal 130 with the AI tool which is generated in association with the difficulty information or the style information in response to the request for the AI tool. Operation S540 is a process of providing a corresponding AI tool to the gamer terminal 130 in response to a transmission request from the gamer 120. The card game AI controlling system 200 may charge the gamer 120 with a predetermined fee for providing the AI tool to the gamer terminal 130.

The AI tool, which is transmitted to the gamer terminal 130, is installed in the gamer terminal 130, and may control the mini game AI included in the gamer terminal 130 to play a game. Here, the mini game AI may provide a card game service to the gamer 120 even when the gamer terminal 130 does not maintain a connection status with the online game server 110. Also, the mini game AI may play as similarly as the card game AI according to a control of the installed AI tool with respect to a particular game situation in the card game service. Specifically, the mini game AI may select one pattern data associated with the play pattern from the pattern data included in the AI tool, and play based on the selected pattern data.

According to the present invention, it is possible to enable the gamer 120 to selectively receive or download the AI tool which includes the gamer's required property, and also to provide a game service to the gamer 120 without restriction to a time and a place, without a continuous access to the online game server 110.

The card game AI controlling method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there is provided a method and system for controlling a card game AI, which can execute a card game AI in a play pattern so that a play trend of a gamer is reflected with respect to a particular arrangement situation of game cards.

Also, according to the present invention, there is provided a method and system for controlling a card game AI, which can determine a play pattern of the card game AI by considering a gamer's capability level or play style, and also can provide an improved game service, as if a gamer plays a card game against another real gamer, even in a card game service where the card game AI plays a game as a game partner.

Also, according to the present invention, there is provided a method and system for controlling a card game AI, which can provide a game service by installing a specialized AI tool according to a gamer's request into a gamer terminal, and enabling the installed AI tool to independently provide a game service in the gamer terminal, even when the gamer terminal does not maintain a continuous connection status with an online game server.

Also, according to the present invention, there is provided a method and system for controlling a card game AI, which can generate an AI tool by extracting a play pattern of a particular group, such as professional gamers, entertainers, teenage girls, and the like, and packaging the extracted play pattern, and also can provide a game service using a mini game AI which copies an excellent player designated by a gamer by downloading the generated AI tool to the gamer terminal.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of controlling artificial intelligence (AI) non-player characters of a card game, the method comprising:

maintaining a database, the database storing plurality of game data in playing a card game, the game data being retrieved from patterns of previous gamers and the game data corresponding to each of card arrangement situations of the card game;

determining a level of a user by checking a play pattern associated with selecting, matching or discarding a card of the card game;

selecting at least one data optimized to the level of the user according to the determination by referring to the database; and selectively providing and executing the AI non-player characters using the selected data.

2. The method of claim 1, wherein the data is generated by analyzing play patterns of the previous gamers and a play pattern of the user in association with the card arrangement situations.

3. The method of claim 2, further comprising:

generating difficulty information or style information associated with the AI non-player characters by analyzing the play pattern of the user; and storing the generated difficulty information or the style information in the database in association with the play pattern.

4. The method of claim 1, wherein selecting at least one data further comprises:

checking a capability level of the user associated with a difficulty of the card game or a play style of the user in association with playing against the AI non-player characters;

identifying the difficulty information or the style information corresponding to the capability level or the play style of the user; and selecting one data from the plurality of game data corresponding to the identified difficulty information or the style information.

5. The method of claim 1, wherein the arrangement situations of the game cards comprise a combination of distributed cards to gamers or a combination of bottom cards to be selected by the gamers.

6. The method of claim 5, wherein the combination of distributed cards comprises a number of game cards which are allocated as the distributed cards from the game cards and a number of game cards which are allocated as the bottom cards from the game cards.

7. The method of claim 2, wherein the game data comprises point information which is generated based on final points acquired in association with playing with one of the Al non-player characters.

8. The method of claim 1, wherein maintaining a database further comprises:

detecting play patterns of the arrangement situations of the card game; and generating pattern data to execute the Al non-player characters and storing the generated pattern data in the database associated with the arrangement situations.

9. The method of claim 8, further comprising:

identifying a user gamer terminal in response to receipt of a game service request associated with the Al non-player characters; and providing the Al non-player characters to the user gamer terminal.

10. A method of controlling Al non-player characters of a game, the method comprising:

generating pattern data by analyzing input patterns of a plurality of previous gamers corresponding to game situations while playing a game, the pattern data being generated from a database which stores plurality of game pattern data based on recent trends of the previous gamers; and determining skill information or style information of a user gamer by correlating the generated pattern data of the previous gamers to a play pattern of the user gamer for playing against the Al non-player characters, wherein the determined difficulty information associated with the Al non-player characters or the style information associated with the user gamer is stored in the database in association with each of the game situations, and wherein an Al tool is provided to the user gamer in association with controlling the Al non-player characters upon receiving a upgrade request by the user gamer and the Al non-player characters are controlled according to a qame pattern of the Al non-player characters associated with each of the game situations.

11. The method of claim 10, further comprising:

classifying the pattern data according to the skill information or the style information associated with the recent trends of the previous gamers corresponding to each of the user gamer, and generating the Al tool according to the classified pattern data.

12. The method of claim 10, further comprising:

providing the Al tool according to the skill information or the style information of the user gamer to the user gamer terminal.

13. The method of claim 10, wherein the Al tool is installed in the user gamer terminal to control the Al non-player characters, which are provided in the gamer terminal, and wherein the Al non-player characters are assigned to the pattern data associated with game situations where one of the Al non-player characters plays the game according to the selected pattern data.

14. The method of claim 13, further comprising:

identifying at least one pattern data from the database by considering a game difficulty level of the Al non-player characters and the difficulty information of the pattern data, and generating the Al tool by using the identified pattern data, wherein the game difficulty level of the Al non-player characters is divided into a high-grade non-player character, an intermediate-grade non-player character, and a low-grade non-player character.

15. The method of claim 13, further comprising:

identifying at least one pattern data associated with a game pattern from the database by considering a game style of the Al non-player characters and the skill information and the style information of the game user, and generating the Al tool by using the identified pattern data, wherein the style of the Al non-player characters is divided into any one between an attack style and a defense style according to any one of an occupation, an age, sex or any combination thereof associated with the game user.

16. The method of claim 10, further comprising:

receiving an upgrade request which is generated at a time interval, the request transmitted from the user gamer terminal;

retrieving the Al tool from the database; and providing the retrieved tool to the user gamer terminal in response to the upgrade request.

17. The method of claim 10, further comprising:

charging the gamer with a fee for providing the Al tool to the user gamer terminal based on time and number of using of each of the Al non-player characters.

18. A non-transitory computer-readable record medium comprising an executable program, which when executed, performs the method of claim 1.

19. A system for controlling non-player characters, the system comprising:

a data generation component to generate a plurality of game pattern data by analyzing input trends of a plurality of previous gamers corresponding to game situations while playing games, wherein the game pattern data is stored in a database, and wherein the database is configured to maintain situations of the games in correspondence to the generated game pattern data;

a situation check component to determine a current situation of one of the games corresponding to one of the non-player characters to play with a user gamer;

a data selection component to select one game pattern data from the plurality of game pattern data according to the determined situation of the game, the selection is performed by referring to the database; and an execution component to execute the non-player characters based on the selected game pattern data associated with the determined distribution situation, wherein an artificial intelligence (AI) tool is provided to the user gamer in association with controlling the non-player characters according to a skill and a style of the game user corresponding to the selected game pattern data.

20. The system of claim 19, wherein the game pattern data is generated by analyzing a previously played play pattern of the game data played by the previous gamers and a play pattern of the user in association with the situation.

21. The system of claim 19, wherein the game pattern data comprises point information based on play results performed by the previous gamers, and the point information is generated by determining points achieved during the game situations, and wherein the data selection component is further configured to select game pattern data comprising point information greater than a predetermined numerical value and randomly to select one game pattern data from the selected game pattern data.

22. The system of claim 19, further comprising:
an Al tool generation component to retrieve data corresponding to difficulty information or style information of the non-player characters from a database, and to generate the Al tool based on the retrieved difficulty information or the style information, the difficulty information or the style information being generated in association with playing with the non-player characters; and
an Al tool providing component to provide the gamer terminal with the Al tool in response to detection of a update request for the Al tool.

* * * * *